(No Model.) 5 Sheets—Sheet 1.

L. P. THOMPSON.
MACHINE FOR EXHIBITING AND TAKING PICTURES.

No. 553,369. Patented Jan. 21, 1896.

FIG. I.

Witnesses
Walter Allen
James M. Spear

Inventor
Lawrence P. Thompson
By Attorney
Herbert W. T. Jenner (No Model.) 5 Sheets—Sheet 2.

L. P. THOMPSON.
MACHINE FOR EXHIBITING AND TAKING PICTURES.

No. 553,369. Patented Jan. 21, 1896.

Witnesses
Walter Allen
James M. Spear

Inventor
Lawrence P. Thompson
By Attorney
Herbert W. T. Jenner

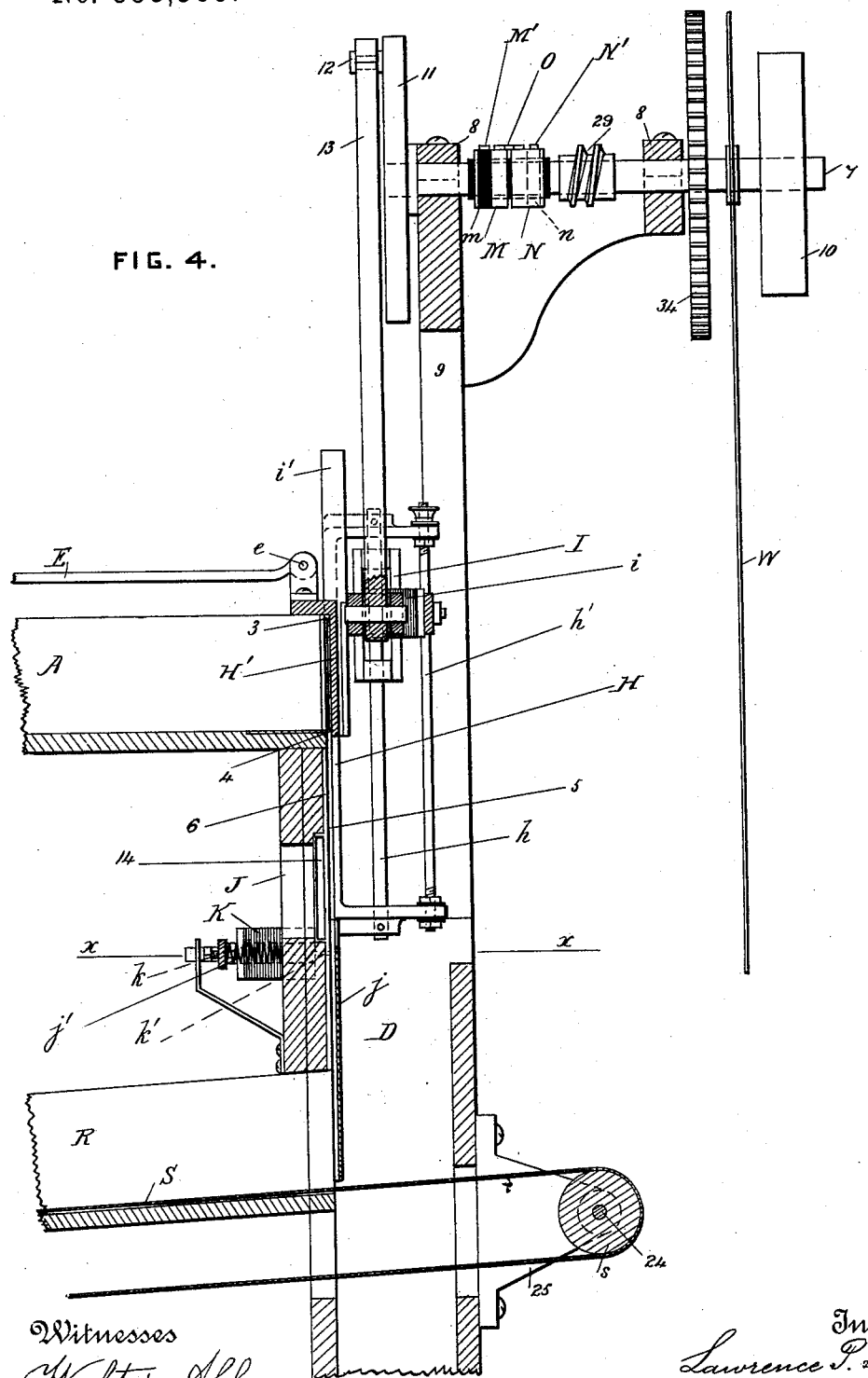

(No Model.)  5 Sheets—Sheet 4.
L. P. THOMPSON.
MACHINE FOR EXHIBITING AND TAKING PICTURES.
No. 553,369. Patented Jan. 21, 1896.
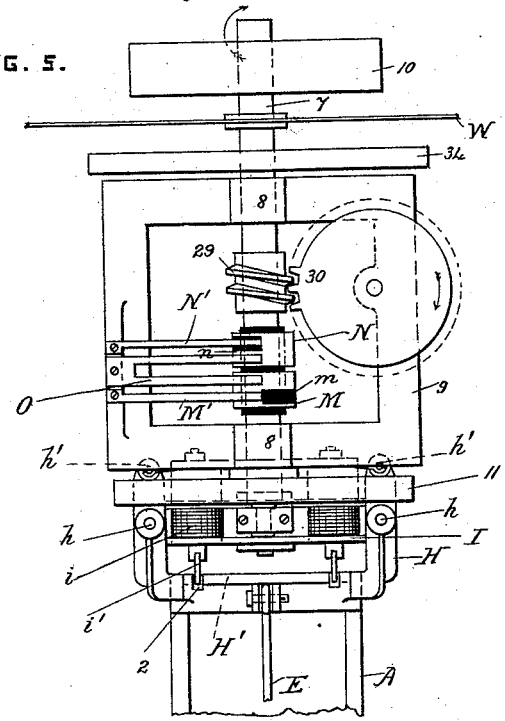
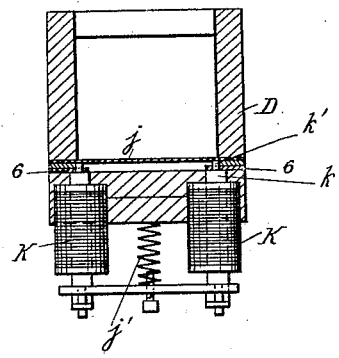
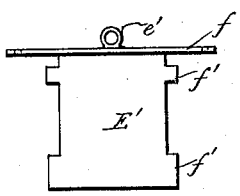
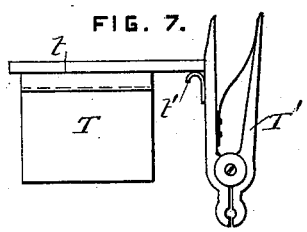
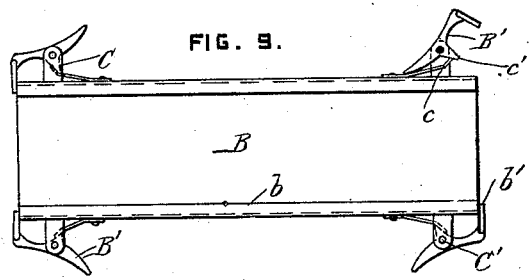
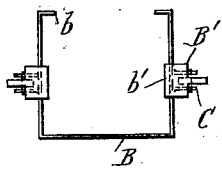
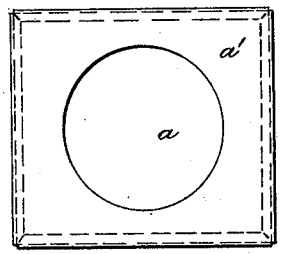
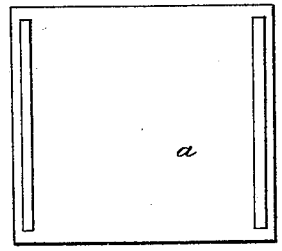
Witnesses
Walter Allen
James M. Spear
Inventor
Lawrence P. Thompson
By Attorney Herbert W. T. Jenner.

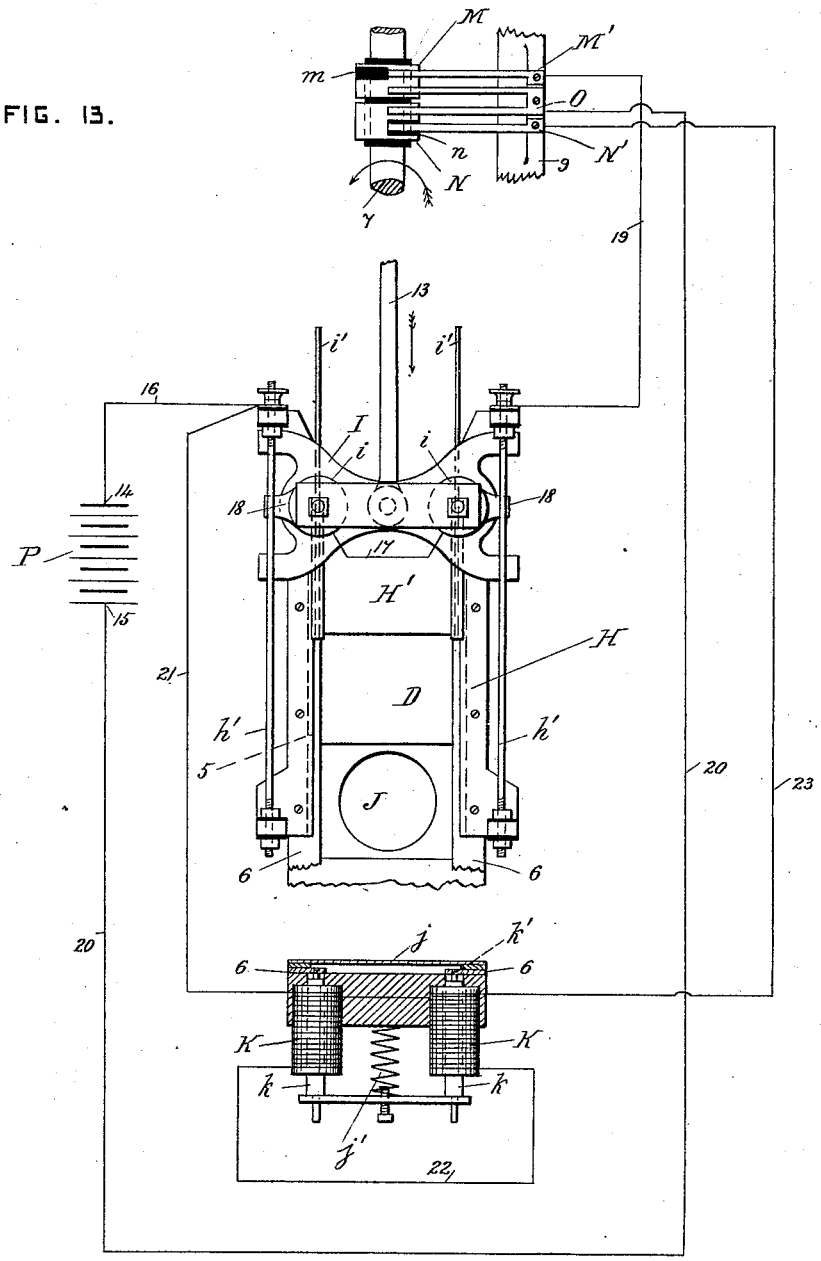

UNITED STATES PATENT OFFICE.

LAWRENCE P. THOMPSON, OF WAYNESBOROUGH, PENNSYLVANIA.

MACHINE FOR EXHIBITING AND TAKING PICTURES.

SPECIFICATION forming part of Letters Patent No. 553,369, dated January 21, 1896.

Application filed April 24, 1895. Serial No. 547,017. (No model.)

*To all whom it may concern:*

Be it known that I, LAWRENCE P. THOMPSON, a citizen of the United States, residing at Waynesborough, in the county of Franklin and State of Pennsylvania, have invented certain new and useful Improvements in Machines for Exhibiting and Taking Pictures; and I do hereby declare the following to be a full, clear, and exact description of the invention, such as will enable others skilled in the art to which it appertains to make and use the same.

This invention relates to machines for exhibiting and taking pictures; and it consists in the novel construction and combination of the parts hereinafter fully described and claimed.

Figure 1:
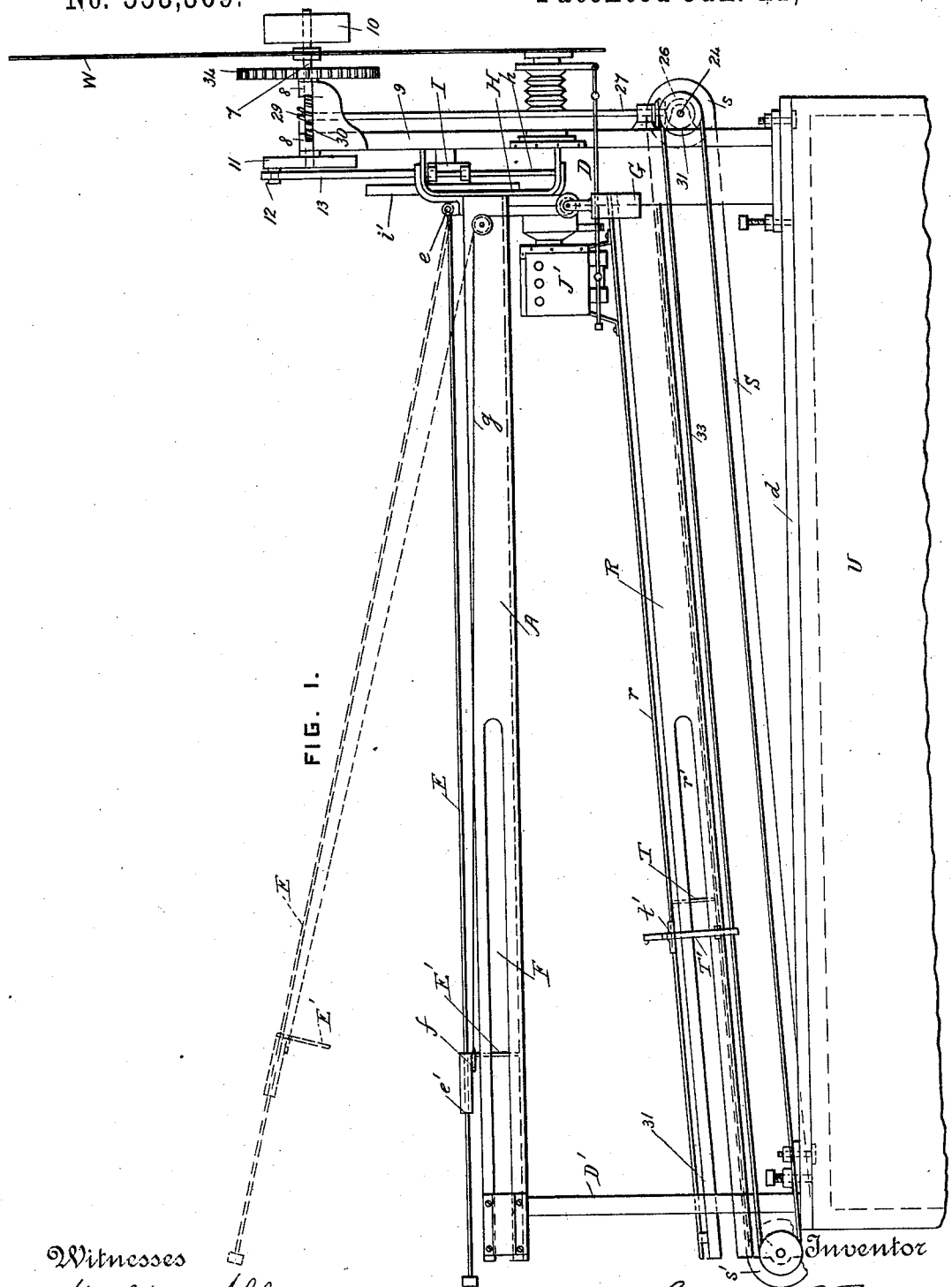
Figure 2:
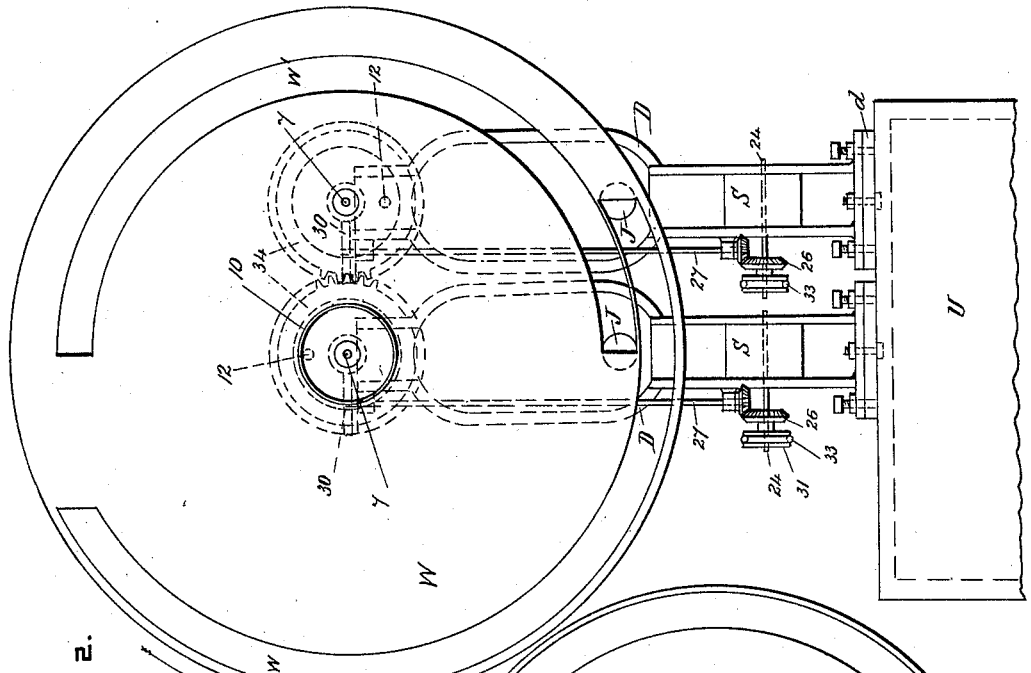
Figure 3:
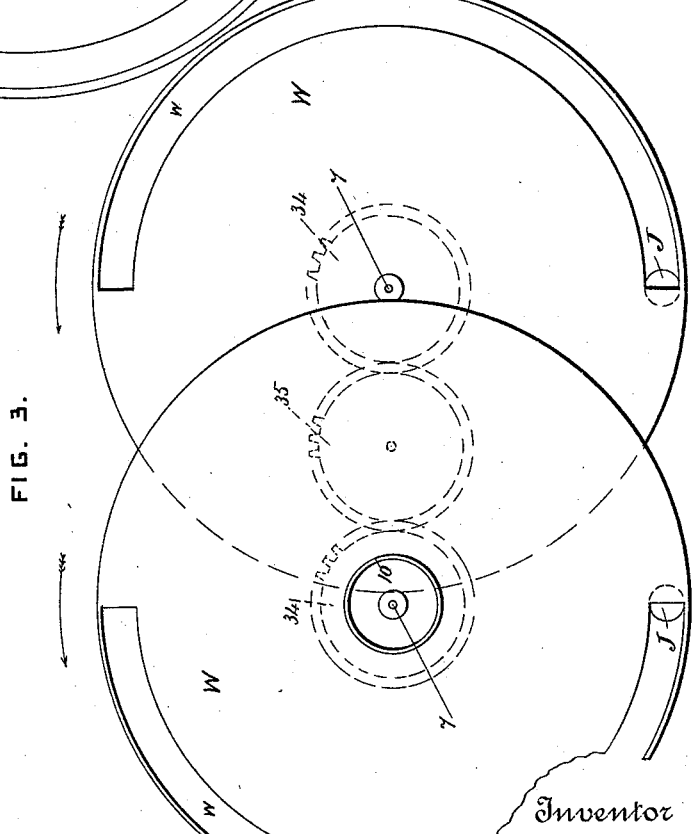

In the drawings, Figure 1 is a side view of the machine. Fig. 2 is a front view of a pair of the machines. Fig. 3 is a front view showing a modification of the shutter mechanism used when the machines are placed wider apart. Fig. 4 is a vertical section through the front part of one of the machines drawn to a larger scale. Fig. 5 is a plan view of the front part of one of the machines. Fig. 6 is a sectional plan view taken on the line $xx$ in Fig. 4. Fig. 7 is a detail front view of the sliding plate and clip used in connection with the receiving-trough. Fig. 8 is a detail front view of the sliding plate used in the feeding-trough. Fig. 9 is a detail plan view, and Fig. 10 is an end view, of the slide for holding the pictures. Fig. 11 is a front view of one of the pictures and its metallic frame. Fig. 12 is a front view of a picture, showing a modification. Fig. 13 is a diagram showing the electrical connections.

A is the feeding-trough, in which the pictures are placed before being fed to the machine. The pictures $a$ may be formed on any approved substance—such as glass, gelatine or celluloid—or they may be upon opaque material when they are to be displayed by reflected light. When the pictures are formed on non-metallic surfaces, they are provided with metallic frames $a'$, as shown in Fig. 11; but they may have metallic contact-pieces secured to them, as shown in Fig. 12, if desired, instead of being inclosed in metallic frames.

The pictures are taken in a series after the manner of the pictures of a kinetoscope, and generally represent the different positions of a moving object or scene, taken at very short and equidistant intervals of time.

The pictures are preferably arranged in a predetermined order and are carried in slides B, one of which is shown in Figs. 9 and 10. Each slide consists of a trough having inwardly-projecting flanges $b$ at its upper edges and spring-actuated catches B' on each side at its ends. Each catch B' is provided with a stop $b'$, which comes in front of the end of the slide and retains the pictures in it.

The spring $c$ bears against a projection $c'$ on the catch when either open or closed, as shown in Fig. 9.

C is the bracket, and C' is the pin by which each catch is supported and connected to the slide.

D is a frame at the front end of the trough A, and D' is a support for the rear end of the trough. The frame D and the support D' are secured to a base-plate $d$.

E is a rod pivoted at the front part of the trough A by the pin $e$, and E' is a back plate provided with a tubular guide $e'$, which slides on a rod E. The plate E' is arranged vertically in the trough A and has laterally-projecting arms $f$ at its top and projections $f'$ on its sides.

When a slide full of pictures is to be inserted into the trough A, the rod E is raised, as indicated by the dotted lines in Fig. 1, and the slide is thrust into its rear end. The sides of the trough are provided with slots F for the catches B' to project through. The front picture in the slide is placed against the rear picture in the trough and the front catches are snapped back to release the pictures. The back plate E' is dropped down behind the rear picture in the slide, and its projections $f'$ come under the flanges $b$ of the slide, so that the plate E' cannot be raised without drawing it backward out of the end of the slide. This prevents the plate E' from being accidentally disengaged from the pictures. The pictures are fed forward by means of two similar weights G, which operate the cords $g$. The cords $g$ pass over guide-pulleys at the front end of the feeding-trough, and are connected to the projecting arms $f$ of the back plate. When all the pictures have been slid out of the slide, the empty slide is removed from the feeding-trough and another slide containing pictures is substituted for it.

H is a guide-frame secured to the frame D at the front end of the trough. This guide-frame H carries two vertical cross-head guides $h$ and two insulated contact-bars $h'$.

I is a cross-head which slides on the guides $h$ and is provided with two electromagnets $i$.

H' is a plate on the guide-frame H. This plate closes the front end of the feeding-trough and the front end picture in the trough bears against it. The cores of the electromagnets $i$ are provided with long vertical pole-pieces $i'$, which slide vertically in the slots 2 in the plate H', and the said pole-pieces are preferably provided with projecting lips 3 near their middle parts and projecting lips 4 near their bottoms; but these lips may be dispensed with, if desired.

Grooves 5 are formed in the guide-frames H, and 6 are facing-plates secured on the frame D. The pictures slide vertically in the grooves 5 in front of the facing-plates 6.

The driving-shaft 7 of the machine is journaled in bearings 8, which are supported by the standard 9 at the front end of the machine. The shaft 7 is provided with a belt-pulley 10 for revolving it, and 11 is a crank-plate secured on the shaft 7 and provided with the crank-pin 12. A connecting-rod 13 couples the crank-pin 12 to the cross-head I, and the cross-head is reciprocated vertically as the shaft 7 is revolved.

J is the hole in front of which the pictures are displayed, and J' is an exhibiting-lantern of approved construction for throwing the pictures displayed at the hole J onto a sheet.

K are two electromagnets secured to the rear part of the frame H a little below the hole J, and $k$ are the cores of the said magnets, which are free to project through holes in the frame D and abut against the plate $j$.

The plate $j$ is arranged vertically below the guide-frame H, and the pictures slide down between the plate $j$ and the facing-plates 6. Slots 14 are formed in the facing-plates 6 on each side of the hole J for the insertion of a colored transparent slide or shutter when required.

The projecting ends of the cores $k$ form stops $k'$, and the cores are normally held pushed out by the spring $j'$ so that the stops $k'$ do not project from the frame D.

The facing-plates 6 are metallic, and the ends of the cores $k$ abut against them when pulled in by the magnets, thereby including the said plates in the circuit and causing them to attract and hold the metallic contact piece, pieces, or frame of the picture. This action of the magnet or magnets on the pictures steadies them while being exhibited in front of the hole J.

M and N are two insulated commutators secured upon the shaft 7 and provided with two hemicylindrical circuit-breakers $m$ and $n$, consisting of pieces of insulating material let into their peripheries at opposite sides of the shaft and at the edges of the commutators which are farthest apart.

M' is an insulated brush carried by the standard 9 and bearing on the commutator M and the circuit-breaker $m$.

N' is an insulated brush carried by the standard 9 and bearing on the commutator N and circuit-breaker $n$.

O is a forked brush, also insulated and carried by the standard 9. This brush O is arranged between the brushes M' and N', and bears upon the two commutators M and N between the circuit-breakers $m$ and $n$.

P is a battery for generating electricity. 14 is its positive pole and 15 is its negative pole. A wire 16 leads from the positive pole to one of the insulated contact-bars $h'$.

The electromagnets $i$ are connected together by the wire 17, and to the respective contact-bars by the contact-springs 18. The top of the other contact-bar $h'$ is connected to the brush M' by the wire 19, and the forked brush O is connected with the negative pole of the battery by the wire 20.

The wire 16 is connected to the electromagnets K by the wire 21, the said electromagnets being connected together by the wire 22. A wire 23 connects the electromagnets K with the brush N', and the brush O and wire 20 complete the circuit to the battery.

The circuit-breakers are hemicylindrical and are arranged on opposite sides of the shaft, so that when the crank-pin is at the top of its stroke the circuit-breaker $m$ is leaving the brush M' and the circuit-breaker $n$ is commencing to pass under the brush N'. When the crank-pin arrives at the bottom of its stroke the circuit-breaker $m$ is touching the brush M' and the circuit-breaker $n$ is leaving the brush N'. When the circuit-breaker $m$ permits the circuit to be completed through the magnets $i$, the pole-pieces $i'$ attract the metallic frame or contact-pieces on the front picture in the feeding trough, and the continued motion of the shaft 7, in the direction of the arrow, causes the said picture to be carried down the grooves 5. The upper lips on the pole-pieces prevent the picture from slipping.

Just before the crank-pin arrives at the bottom of its stroke the circuit-breaker $m$ breaks the circuit through the magnets $i$ and thereby releases the picture. At the same instant the circuit-breaker $n$ permits the circuit to be completed through the magnets K, and the stops $k'$ are thrust forward under the lower edge of the picture which is supported by them in front of the hole J. The picture remains in front of the hole J until the crank-pin arrives at the top of its stroke, and the circuit-breaker $n$ then de-energizes the magnets K.

When the stops are withdrawn from under the picture it drops down between the plate $j$ and the facing plate 6. If the picture does not slide down freely it is pushed down by the lower lips on the pole-pieces at the next descent of the cross-head.

The shaft 7 is driven at a high speed and the pictures are exhibited one after another in front of the hole J with great rapidity, each picture remaining stationary in front of the said hole while the shaft is making half a revolution.

R is the receiving-trough at the lower part of the machine. The front end of this trough is carried by the frame D and its rear end by the support D'. The trough R is preferably arranged under the trough A and is inclined downwardly from front to rear. Both troughs are preferably straight, but they may be curved if desired.

S is an ordinary conveyer of flexible material running over the bottom of the trough R and having its ends carried by the rollers $s\ s'$.

The receiving-trough has slots $r'$ in its sides to accommodate the catches on the slide B, as hereinbefore described.

The roller $s$ is mounted on a shaft 24 which is journaled in the brackets 25 at the front end of the machine, and 26 is a beveled wheel secured on the said shaft.

A vertical shaft 27 is carried by the bracket 28 and the standard 9, and has a beveled toothed pinion secured on its lower end and gearing into the said wheel 26.

A worm 29 is secured on the shaft 7 and gears into a worm-wheel 30 secured on the upper end of the shaft 27. By means of the said driving devices the upper part of the conveyer is moved slowly from front to rear and takes with it the pictures which descend onto it after being displayed in front of the hole J.

T is a sliding plate which is dropped between the pictures in the trough R to prevent them from falling over backward when the pictures at the rear of the plate T are removed. The plate T is provided with a top cross-bar $t$ and a guide $t'$ which slides upon the rod $r$ secured above the trough on one side thereof.

Sheaves 31 are secured upon the shafts 24 and 32 of the rollers $s\ s'$, and 33 is a flexible connection, such as a rope or chain, passing around the said sheaves.

T' is a spring-actuated clip on the projecting end of the cross-bar $t$. This clip engages with the flexible connection 33, so that the plate T is moved to the rear as fast as the pictures are deposited on the conveyer.

The pictures are removed from the trough R by placing a slide B in it and allowing the slide to be filled with pictures by the motion of the conveyer and plate T. When the slide is full of pictures another similar plate T is slipped between the pictures at the front end of the slide and is clipped to the flexible connection. The filled slide is then removed and an empty slide is inserted in its place.

In order to display the pictures to the best advantage, and also to produce the effect of objects in motion, two or more machines are used and are arranged side by side, with their lanterns inclined so as to throw the light onto the same spot on the sheet.

The driving-shafts 7 of these machines are positively connected by the toothed wheels 34, so that they revolve synchronously, one machine being arranged with its crank-pin and cross-head up when the crank-pin and cross-head of the other machine are down.

U is a stand for the two machines, and may also form a cupboard for the pictures.

W is a shutter secured on the shaft 7 of one of the machines. This shutter is provided with a curved slot $w$ coming in front of the lens of the machine to which it is connected and a second curved slot $w'$ coming in front of the lens of the other machine. This shutter cuts off the light from the two lanterns alternately and at those times when the pictures are not in positions to be exhibited. The pictures of the two machines are exhibited alternately and are merged one into the other with such rapidity as to produce the effect of a single moving picture or object upon the sheet.

Instead of using a single shutter with two slots, two shutters may be used, one for each machine. Each shutter has then only one slot, and an idle-wheel 35 is interposed between the toothed wheels 34 so that the two shutters may revolve in the same direction, it being desirable that the pictures should be merged into each other from the same side, so that the change from one picture to the other will not be discernible on the sheet.

When the operating devices of this machine are used to take the pictures, only one machine is required, but two machines may be used if desired. The whole machine is inclosed in a dark-chamber large enough to give the operator room to work. A photographic camera of approved construction is substituted for the exhibiting-lantern hereinbefore described, and the front end of the camera is arranged in front of an aperture in the wall of the dark-chamber. The pictures are taken by the camera one after the other, and the slot in the shutter is proportioned in length so as to give the required exposure.

What I claim is—

1. The combination, with electrically attractible pictures, of a movable electro-magnet operating to seize the pictures one by one and place them in a position to be exhibited, and means for automatically de-energizing the said electro-magnet and thereby releasing the said pictures, substantially as set forth.

2. The combination, with a picture provided with a metallic frame, of reciprocatory electromagnets provided with lips on their pole pieces, for moving the picture into position, substantially as set forth.

3. The combination, with a picture, and reciprocatory electromagnets for moving the picture into position; of retractible stops for supporting the said picture in position, substantially as set forth.

4. The combination, with a picture, and reciprocatory electromagnets for moving the picture into position; of a circuit breaker for energizing and de-energizing the electromagnets, thereby causing the picture to be seized and released, substantially as set forth.

5. The combination, with a picture, and reciprocatory electromagnets for moving the picture into position; of stationary electromagnets and spring-actuated retractible stops for supporting the picture in position; and circuit breakers operating to energize and de-energize the reciprocatory and stationary magnets alternately, whereby the picture is seized, released, supported and dropped, substantially as set forth.

6. The combination, with the guide frame provided with guides and contact bars; of the crosshead and the electromagnets sliding on the said guides and provided with contact springs bearing against the said bars, a driving shaft and intermediate driving mechanism operating to reciprocate the crosshead and the electromagnets, an electricity generator and wires connected to the contact bars, and a circuit breaker carried by the said shaft and included in the circuit, substantially as set forth.

7. The combination, with the stationary electromagnets, and their spring-actuated cores provided with stops for supporting a picture; of a driving shaft, an electricity generator, and wires connected with the said electromagnets; and a circuit breaker carried by the said shaft and operating to de-energize the electromagnets at intervals, thereby permitting the withdrawal of the stops from under the picture, substantially as set forth.

8. The combination, with the reciprocatory electromagnets, and a driving shaft and intermediate driving mechanism operating to reciprocate the said electromagnets; of the stationary electromagnets, and their spring-actuated cores provided with stops for sustaining a picture; an electricity generator and wires connected with the said electromagnets; the two commutators secured on the said shaft and provided with circuit breakers on opposite sides of the shaft; and the brushes bearing on the said commutators, included in the circuit, and operating to energize and de-energize the said reciprocatory and stationary electromagnets alternately, substantially as set forth.

9. The combination, with the guide frame provided with a plate for the pictures to bear against, and vertical slots arranged one on each side of the said plate; of the reciprocatory electromagnets provided with long pole pieces slidable in the said slots and operating to seize and depress the said pictures one by one, substantially as set forth.

10. The combination, with a trough-shaped slide for holding the pictures, of spring-actuated catches carried by the end portions of the said slide and operating to retain the said pictures in the slide, substantially as set forth.

11. The combination, with the feeding trough; and the rod pivoted at the front end of the trough, of the back-plate provided with a guide slidable on the said rod, and means—such as cords and weights—for pressing the back-plate longitudinally in the trough and thereby feeding forward the pictures, substantially as set forth.

12. The combination, with the feeding trough; of the rod pivoted at the front end of the trough, the back-plate provided with a guide slidable on the said rod, and having projections on its sides; and the trough-shaped slide for holding the pictures, slidable in the said trough and provided with flanges engaging with the projections on the sides of the back-plate, substantially as set forth.

13. The combination, with the receiving trough; of the conveyer passing over the bottom of the said trough, the slidable plate in the receiving trough for the pictures to bear against, and driving mechanism operating to move the said conveyer and plate at the same speed, substantially as set forth.

14. The combination, with the receiving trough, the conveyer passing over the bottom of the said trough, and the flexible connection arranged outside the trough and driven at the same speed as the conveyer; of the plate adapted to be dropped into the trough and provided with a clip for connecting it to the said flexible connection outside the trough, substantially as set forth.

15. The combination, with the receiving trough, the conveyer passing over the bottom of the said trough, the guide rod arranged longitudinally of the trough, and the flexible connection arranged outside the trough and driven at the same speed as the conveyer; of the plate adapted to be dropped into the trough, and provided with a guide slidable on the said rod, and a clip for engaging with the said flexible connection, substantially as set forth.

16. The combination, with a frame provided with a display hole, of driving mechanism operating to slide pictures one by one in front of the said hole, and a movable support for sustaining each picture in front of the hole, said support being operatively connected with the said driving mechanism and thereby constrained to move from under each picture and return to its original position before the next following picture is slid in front of the said hole, substantially as set forth.

17. The combination, with a frame provided with a display hole, of driving mechanism operating to place pictures one by one in front of the said hole, a movable support for sustaining each picture in front of the hole, and a movable shutter, said support and shutter being operatively connected with the said driving mechanism, whereby each picture is automatically released before the next following picture is moved in front of the said hole, and the said hole is covered by the shutter at those times when a picture is not supported in front of it, substantially as set forth.

18. The combination, with a picture provided with a metallic contact piece, of a stationary electromagnet, and a circuit breaker, said magnet operating to attract and steady the picture while being exhibited, substantially as set forth.

19. The combination, with a receptacle, and pictures placed therein and provided with metallic contact pieces; of a movable electromagnetic device, and driving mechanism for operating the said device, whereby the pictures are attracted and removed one by one from the said receptacle, substantially as set forth.

In testimony whereof I affix my signature in presence of two witnesses.

LAWRENCE P. THOMPSON.

Witnesses:
J. F. THOMPSON,
F. C. CUNNINGHAM.